United States Patent [19]

Coates et al.

[11] Patent Number: 5,426,009
[45] Date of Patent: Jun. 20, 1995

[54] POLYMERIC COMPOSITE MATERIAL

[75] Inventors: David Coates, Merley Wimborne; Mark Verrall, Blandford Forum; Emma J. Brown, Weymouth, all of Great Britain

[73] Assignee: Merck Patent Gesellschaft Mit Beschrankter Haftung, Darmstadt, Germany

[21] Appl. No.: 123,870

[22] Filed: Sep. 17, 1993

[30] Foreign Application Priority Data

Sep. 19, 1992 [EP] European Pat. Off. ............ 92116050

[51] Int. Cl.⁶ ............... C09K 19/54; C09K 19/46; C09K 19/38
[52] U.S. Cl. .................................. 430/20; 525/276; 525/279; 525/281; 525/286; 525/328.4; 252/299.01; 252/299.61; 252/299.62; 252/299.63; 252/299.64; 252/299.65; 252/299.66; 252/299.67; 252/299.5
[58] Field of Search ............ 525/276, 286, 295, 328.4; 252/299.01, 299.61, 299.63, 299.66, 299.67, 299.5

[56] References Cited

U.S. PATENT DOCUMENTS

| | | | |
|---|---|---|---|
| 4,443,065 | 4/1984 | Funada et al. | 359/53 |
| 4,702,558 | 10/1987 | Coles et al. | 359/46 |
| 4,807,968 | 2/1989 | Leslie | 252/299.01 X |
| 4,844,569 | 7/1989 | Wada et al. | 359/53 |
| 4,888,126 | 12/1989 | Mullen et al. | 252/299.5 |
| 4,906,066 | 3/1990 | Ryan | 385/107 |
| 4,995,705 | 2/1991 | Yoshinaga et al. | 354/44 |
| 5,071,588 | 12/1991 | Schrott et al. | 252/299.1 |
| 5,119,216 | 6/1992 | Wada et al. | 359/53 |
| 5,188,760 | 2/1993 | Hikmet et al. | 252/299.01 |

FOREIGN PATENT DOCUMENTS

| | | |
|---|---|---|
| 0239433 | 9/1987 | European Pat. Off. |
| 0320283 | 6/1989 | European Pat. Off. |
| 63-271232 | 11/1988 | Japan |
| 64-79724 | 3/1989 | Japan |
| 1-206318 | 8/1989 | Japan |

OTHER PUBLICATIONS

Gray, G. W., *Thermotropic Liquid Crystals*, pp. 159, 164 Publ: John Wiley & Sons (1987).
Hessel et al., *Makromol. Chem.* 188, 1597–1611 (1987).
Ballauf, "Flüssig-kristalline Polymere", *Chemie in unsere Zeit*, Nr. 2 1988.
Chandrasekhar, F. R. S., *Liquid Crystals*, 2nd Ed., pp. 8–11, Pub.: Cambridge University Press, 1977.

*Primary Examiner*—Mark Nagumo
*Attorney, Agent, or Firm*—Millen, White, Zelano, & Branigan

[57] ABSTRACT

The invention relates to a polymeric composite material which:
- is based on a liquid crystal polymer component,
- exhibits a high glass transition temperature of at least 60° C. and a scattering texture when deposited as a thin film,
- can be rendered transparent by being heated above the glass transition temperature and/or clearing temperature, and
- is obtained by mixing a liquid crystal polymer component, a reactive liquid crystalline component, optionally a polymerization initiator component, and/or further additive components, with subsequent polymerization.

8 Claims, 3 Drawing Sheets

POLYMERIC COMPOSITE MATERIAL

FIELD OF THE INVENTION

The invention relates to a polymeric composite material which:
- is based on a liquid crystal polymer component,
- exhibits a high glass transition temperature of at least 60° C. and a scattering texture when deposited as a thin film, and
- can be rendered transparent by being heated above the glass transition temperature and/or clearing temperature.

BACKGROUND OF THE INVENTION

Materials of this type, especially in the form of thin films, can be used as devices for data storage. A typical example is a liquid crystal polymer which will usually scatter light when being cooled slowly down from the isotropic to the mesogenic state (see, for example, V. P. Shibaev et al., Thermo-Recording on the Liquid Crystalline Polymers, ed. by A. Blumstein, New York, 1985, pp. 345-350); scattering is due to fluctuations of the direction of the mesogenic groups on a sub-micron to micron scale.

When the glass transition temperature is not too much lower than the clearing temperature of the liquid crystal polymer, rapid cooling from the isotropic state below the glass transition state will result in a transparent glassy state, i.e. the isotropic structure of the liquid 30 crystal polymer is frozen in (see, for example, H. Finkelmann, Phil. Trans. R. Soc. Lond. A309 (1983), 105).

The film can therefore be used as permanent data storage: the information is written in by heating with a suitable heat source, for example by a laser beam, with subsequent supercooling and is depicted in transparent Symbols on a scattering background. Permanent data storage, however, requires that the storage temperature is lower than TG, otherwise the film will be transferred to the scattering state again.

It is evident from this that the liquid crystal polymer must exhibit the following features when being used as permanent data storage:
- a high glass temperature of at least 60° C. in order to avoid erasure of data by probable high ambient temperatures
- a rather low temperature difference of not more than 40° C., preferably less than 30° C. and, in particular, of not more than 20° C. between the glass transition temperature and the clearing point
- high scattering power m the scattering state in order to obtain a sufficient contrast Up to now, however, it was not possible to design a liquid crystal polymer exhibiting all these properties. In particular, the present inventors found out that low-$T_G$ liquid polymers ($T_G < 50°$ C.) when being solved in a solvent like dichloromethane (DCM) or toluene and cast as a thin film on a surface with subsequent evaporation of the solvent, quite generally scatter light well; contrary to this, high-$T_G$ ($T_G > 70°-80°$ C.) liquid crystal polymer films generally exhibit a completely insufficient scattering power or do not scatter at all. This is an experimental fact which up to now could not be satisfactorily explained theoretically.

It was therefore necessary to develop a completely new material concept in order to fulfill the requirements outlined above and to fulfill them to a greater extent than is the case with conventional liquid crystal polymers. Other objects of the present invention are evident for the expert from the following detailed description of the invention.

It was found that these objects can be achieved by the polymeric composite materials according to the present invention.

SUMMARY OF THE INVENTION

The invention thus relates to a polymeric composite material
- which is based on a liquid crystal polymer component,
- which exhibits a high glass transition temperature of at least 60° C. and a scattering texture, when deposited as a thin film,
- which can be rendered transparent by being heated above the glass transition temperature and/or clearing temperature, and
- which is obtainable by mixing a liquid crystal component, a reactiveliquid crystalline component, optionally a polymerization initiator component and/or further components, with subsequent polymerization.

The polymeric composite materials according to the present invention are being based on a liquid crystal polymer component. The liquid crystal polymer component can consist of one liquid crystal polymer or oligomer or a mixture of two or more liquid crystal polymers and/or oligomers of different chemical composition. Mixing can be effected by solving the different liquid crystal polymers and/or oligomers in a suitable solvent like, for example, dichloromethane (DCM), with subsequent evaporation of the solvent or by other methods.

BRIEF DESCRIPTION OF THE DRAWINGS

Various other objects, features, and attendant advantages of the present invention will be more fully appreciated as the same becomes better understood when considered in conjunction with the accompanying drawings in which like reference characters designate the same or similar parts throughout the several views, and wherein.

DETAILED DESCRIPTION OF THE PREFERRED EMBODIMENTS

Figure 1:
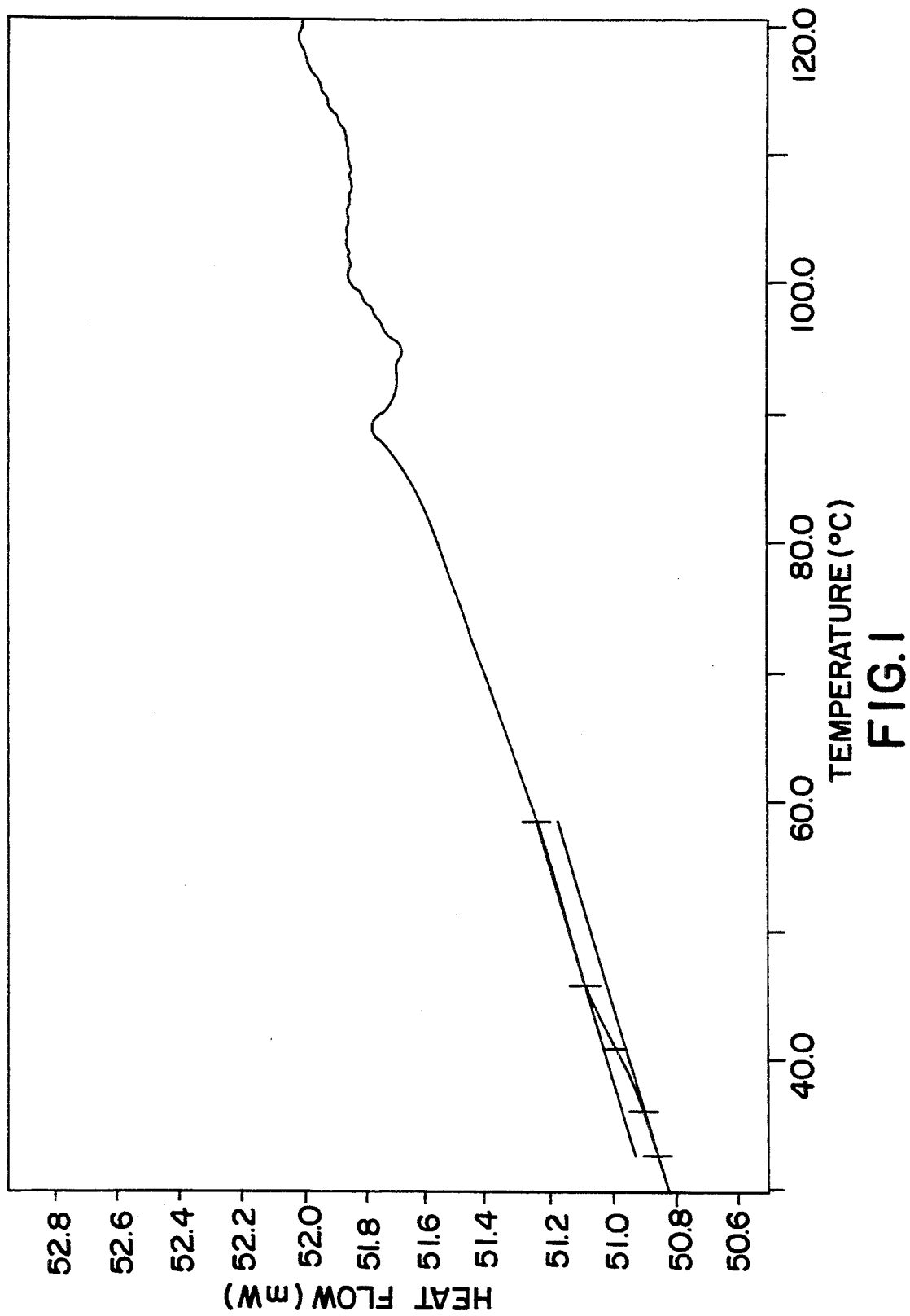
FIG. 1 shows a DSC curve for the uncured film of Example 1.

The liquid crystal polymers used can be main chain or side chain preferably, however, side chain polymers and/or oligomers of formula I

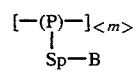

wherein
- is a polymer main chain group
- Sp is a bivalent spacer group,
- B is an organic rod-like radical containing at least two six-membered groups, a disc-like radical or a board-like radical, and
- $<m>$ is the mean degree of polymerization.

Rod-like and disc-like mesogenic groups are discussed in S. Chandrasekhar, *Liquid Crystals*, Cambridge, page 10. Board-like structures are discussed in F. Hessel et al., *Makromol. Chem.*, 188 (1987), 1597–1611; see, in particular, FIG. 2.

Formula I is merely intended to symbolize side-chain oligomers and polymers in a relatively diagrammatic manner; thus, it is not necessary, for example, for each main-chain unit to carry a mesogenic unit, and it is also possible, for example, to use copolymers in which P represents various main-chain units. Furthermore, P or, in the case of copolymers, one or more groups P may be one or more mesogenic groups, so that formula I also covers combined main chain/side-chain oligomers and polymers.

A good review on side-chain polymers and processes for their preparation is given by H. Finkelmann in Thermotropic Liquid Crystals, ed. by G. W. Gray, Chichester 1987, p. 159 ff.

If a mixture of 2 or more liquid-crystalline oligomers and/or polymers is used, <m> is the arithmetic mean of the mean degrees of polymerization of the various components of the polymer phase. Liquid-crystalline polymers may be liquid-crystalline or not; in case they are liquid-crystalline they may have various phases. A correlation is frequently being observed for side-chain polymers containing mesogenic groups B which are not too polar between the phase sequence of the corresponding low-molecular-weight compounds B and that of the side-chain polymers (see Thermotropic Liquid Crystals, ed. by G. W. Gray, Chichester 1987, p. 164). Liquid-crystalline polymers and in particular side-chain polymers having a nematic and/or smectic phase and further particularly having a nematic phase are preferred, the terms nematic and smectic being broadly dram and also covering cholesteric-nematic and cholesteric-smectic phases having a helical structure.

Suitable polymeric backbones —(—P—)— are in principal all polymers whose chains have a certain flexibility. These may be linear, branched or cyclic polymer chains. The degree of polymerization is normally at least 10 and in particular at least 15; however, oligomers containing 3 to 15 monomer units are also possible.

Preference is given to polymers containing C—C main chains, in particular polyacrylates, polymethacrylates, poly-α-halo-crylates, poly-α-cyanoacrylates, polyacrylamides, polyacrylonitriles or poly-α-polymethylene malonates. Further preference is also given to polyesters, polyamides, polyimides, polyphophazenes, polyurethanes, and, in particular, to polysiloxanes.

Suitable spacers are in particular linear or branched alkylene groups having 1–20 and, in particular, 1–8 carbon atoms, in which, in addition, one or more non-adjacent CH2 groups may be replaced by —O—, —S—, —CO—, —O—CO—, —S—CO—, —O—COO—, —CO—S—, —CO—O—, —CH—halogen—, —CH-CN—, —CH=CH— or —C≡C—.

Examples of suitable spacers are the following groups: ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyliminoethylene and 1-methylalkylene.

B is preferably a rod-like or board-like mesogenic group.

The rod-like inesogenic groups are generally low-molecular-weight liquid-crystalline radicals which are bonded terminally or laterally to the polymer chain via sufficiently flexible spacers. In the case of terminal linking, which is generally preferred, these radicals are able to rotate about the molecular long axis and therefore have cylindrical symmetry.

If, by contrast, an extremely rigid spacer group virtually suppresses rotation of the nematic radicals, board-like mesogenic groups are obtained. However, it is also possible for other radicals having board-like geometry to be used.

In liquid-crystalline polymers containing board-like mesogenic groups, it is not only possible for the molecular long axes to be arranged parallel, but an alignment long-range order with respect to the transverse axes is also possible. Liquid-crystalline polymers of this type are known as biaxially nematic. B is particularly preferably a radical of the formula III

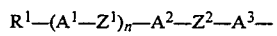  III in which $R^1$ is halogen, CN or an alkyl radical which is unsubstituted or substituted by at least one halogen atom and in each case contains 1–15 carbon atoms, and in which one or more non-adjacent CH2 groups may be replaced by —O— and/or —S atoms and/or by —CO—, —O—CO—, —CO—O—, —O—CO—O—, —S—CO— and/or —CO—S and/or—CH=CH— groups, $Z^1$ and $Z^2$ are each, independently of one another, —CO—O—, —O—CO—, —CH2CH2—, CH2—O—, —OCH2—, —C≡C $A^1$, $A^2$ and $A^3$ are each, independently of one another, a 1,4-phenylene group in which, in addition, one or more CH groups may be replaced by N, a 1,4-cyclohexylene group in which, in addition, one or two non-adjacent CH2 groups may be replaced by O and/or S, a 1,4-cyclohexenylene group, a 1,4-bicyclo(2,2,2)octylene group, a piperidine-1,4-diyl group, a naphthalene-2,6-diyl group, a decahydronaphthalene-2,6-diyl group, or a 1,2,3,4-tetrahydronaphthalene-2,6-diyl group, it being possible for all these groups to be unsubstituted or monosubstituted or polysubstituted by halogen, nitrile and/or C1-C4-alkyl, and n is 0, 1, 2 or 3.

The formula III covers the bicyclic, tricyclic, tetracyclic and pentacyclic radicals of the sub-formula III-1–III4:

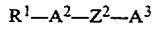  III 1

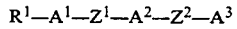  III 2

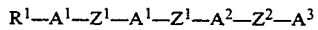  III 3

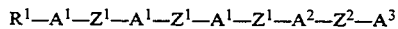  III 4

In the mesogenic radicals of the formula III, R1 is preferably an alkyl or alkenyl radical which is unsubstituted or substituted by at least one halogen atom, it being possible for one or two non-adjacent CH2 groups of these radicals to be replaced by O atoms and/or by —O—CO—, —CO—O— and/or —O—CO—O groups.

Halogen is preferably F or Cl.

Furthermore, the mesogenic radicals of the formula III in which R1 is CN, F or Cl are preferred.

If $R^1$ is an alkyl radical or alkoxy radical, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy or octoxy, furthermore methyl, nonyl, decyl, undecyl, dodecyl, tridecyl, tetradecyl, pentadecyl, methoxy, nonoxy, decoxy, undecocy, dodecocy, tridecoxy or tetradecoxy.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxdecyl.

If $R^1$ is an alkenyl radical, this may be straight-chain or branched. It is preferably straight-chain and has 2 to 20 carbon atoms. Accordingly, it is particularly vinyl, prop-1- or -2-enyl, but -1-, -2- or -3-enyl, pent- 1-, -2-, -3- or -4-enyl, hex-1-, -2-, -3-, -4- or -5-enyl, hept-1-, -2-, -3-, -4-, -5 or 6-enyl, oct-1-, -2-, -3-, -4-, -5-, -6- or 7-enyl, non-1-, -2-, -3-, -4-, -5-, -6-, -7- or -8-enyl, or dec-1-, -2-, -3-, -4-, -5-, -6-, -7-, -8- or -9-enyl.

Mesogenic radicals of the formula III containing a branched wing group R1 may occasionally be of importance as comonomers, for example due to a reduction in the tendency towards crystallization. Branched groups of this type generally contain not more than one chain branch. Preferred branched radicals R1 are isopropyl, 2-butyl(=1-methylpropyl), isobutyl(=methylpropyl), 2-methylbutyl, isopentyl (=3-methylbutyl), 2-methylpentyl, 3-methylpentyl, 2-ethylhexyl, 2-propylpentyl, 2-octyl, isoprpoxy, 2-methylpropoxy, 2-methylbutoxy, 3-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methoxyoctoxy, 6-methyloctanoyloxy, 5-methylheptyloxycarbonyl, 2-methylbutyryloxy, 3-methylvaleryloxy, 4-methylhexanoyloxy, 2-chloropropionyloxy, 2-chloro-3-methylvaleryloxy, 2-methyl-3-oxapentyl and 2-methyl-3-oxahexyl.

Bicyclic, tricyclic and tetracyclic mesogenic radicals are preferred. Furthermore preferred are radicals which contain not more than one 1,4-bicyclo(2,2,2)octylene group, piperidine-1,4-diyl group or 1,2,3,4-tetrahydronaphthalene-2,6diyl group.

In pentacyclic mesogenic radicals, $Z^2$ is preferably a single bond or —CH$_2$CH$_2$—.

Of the mesogenic radicals of the formula III which contain a heterocyclic groups, those containing a pyridine-2,5-diyl group, pyridazine-2,5-diyl group, pyrimidine-2,5-diyl group or piperidine-1,4-diyl group are particularly preferred.

A smaller group of particularly preferred mesogenic radicals of the formulae III 1, III 2 and III 3 is listed below. For reasons of simplicity, Cyc denotes a 1,4-cyclohexylene group, Dio denotes a dioxane-2,5-diyl group, Cy denotes a 1,4-cyclohexylene group in which, in addition, one or two adjacent CH2 groups may be replaced by —O—, Phe denotes a 1,4-phenylene group in which, in addition, one or more CH groups may be replaced by N, PheX denotes a 1,4-phenylene group which is monosubstituted or disubstituted by F, Cl and/or CH$_3$, Bi denotes a 1,4-bicyclo[2.2.2]octylene group, Pip denotes a piperidine-1,4-diyl group and Nap denotes a deca- or tetrahydronaphthalene-2,6-diyl or naphthalene-2,6-diyl group. Particularly preferred mesogenic radicals of the sub-formula III 1 are those of the sub-formulae III 1-1 to III 1-8:

| | |
|---|---|
| $R^1$—Cyc—$Z^2$—Cyc— | III 1-1 |
| $R^1$—Phe—$Z^2$—Phe— | III 1-2 |
| $R^1$—Phe—$Z^2$—PheX— | III 1-3 |
| $R^1$—Phe—$Z^2$—Cyc— | III 1-4 |
| $R^1$—Cyc—$Z^2$—Phe— | III 1-5 |
| $R^1$—Cyc—$Z^2$—PheX— | III 1-6 |
| $R^1$—Cyc—$Z^2$—PheX— | III 1-7 |
| $R^1$—PheX—$Z^2$—Phe— | III1-8 |

In the compounds of the sub-formulae III 1-1 to III 1-8, R is very particularly preferably an alkyl or alkenyl group, furthermore alkoxy or alkanoyloxy, in each case having 1–13 carbon atoms. Furthermore, $Z^2$ in these compounds is very particularly preferably an ester group (—CO—O— or —O—CO—), —CH$_2$CH$_2$— or a single bond.

Particularly preferred mesogenic radicals of the sub-formula III2 are those of the sub-formulae III 2-1 to III 2-16:

| | |
|---|---|
| $R^1$—Phe—$Z^1$—Phe—$Z^2$—Phe— | III 2-1 |
| $R^1$—PheX—$Z^1$—Phe-$Z^2$—Phe— | III 2-2 |
| $R^1$—Phe—$Z^1$—Phe—$Z^2$—PheX— | III 2-3 |
| $R^1$—Cyc—$Z^1$—Cyc—$Z^2$—Cyc— | III 2-4 |
| $R^1$—Cyc—$Z^1$—Phe—$Z^2$—Phe— | III 2-5 |
| $R^1$—Cyc—$Z^1$—Cyc—$Z^2$—Phe— | III 2-6 |
| $R^1$—Cyc—$Z^1$—Cyc—$Z^2$—Dio— | III 2-7 |
| $R^1$—Cyc—$Z^1$—Phe—$Z^2$—PheX— | III 2-8 |
| $R^1$—Cyc—$Z^1$—Cyc—$Z^2$—PheX— | III 2-9 |
| $R^1$—Bi—Cyc—$Z^2$—Cyc— | III 2-10 |
| $R^1$—Nap—$Z^1$—Cyc—$Z^2$—Phe— | III 2-11 |
| $R^1$—Cy—$Z^1$—Phe—$Z^2$—Phe— | III 2-12 |
| $R^1$—Dio—$Z^1$—Cyc—$Z^2$—Cyc— | III 2-13 |
| $R^1$—Phe—$Z^1$—Cyc—$Z^2$—Cyc— | III 2-14 |
| $R^1$—Cyc—$Z^1$—Phe—$Z^2$—Cyc— | III 2-15 |
| $R^1$—Cyc—$Z^1$—PheX—$Z^2$—Cyc— | III 2-16 |

Of the compounds of the sub-formulae III 2-1 to III 2-16 which contain a 1,4-phenylene group in which one or two CH$_2$ groups have been replaced by N, those containing a pyridine-2,5-diyl group or pyrimidine-2,5-diyl group are very particularly preferred.

Particularly preferred mesogenic radicals of the sub-formula III 3 are those of the sub-formulae III 3-1 to III 3-19:

| | |
|---|---|
| $R^1$—Phe—$Z^1$—Phe—$Z^2$—Phe—$Z^2$—Phe— | III 3-1 |
| $R^1$—Cyc—$Z^1$—Cyc—$Z^1$—Cyc—$Z^2$—Cyc— | III 3-2 |

| | |
|---|---|
| $R^1$—Cyc—$Z^1$—Phe—$Z^1$—Phe—$Z^2$—Phe— | III 3-3 |
| $R^1$—Cyc—$Z^1$—Cyc—$Z^1$—Phe—$Z^2$—Phe— | III 3-4 |
| $R^1$—Cyc—$Z^1$—Cyc—$Z^1$—Cyc—$Z^2$—Phe— | III 3-5 |
| $R^1$—Cyc—$Z^1$—Phe—$Z^1$—Phe—Cyc— | III 3-6 |
| $R^1$—Cyc—$Z^1$—Cyc—$Z^1$—Phe—Cyc— | III 3-7 |
| $R^1$—Cyc—$Z^1$—Phe—$Z^1$Cyc—$Z^2$—Cyc— | III 3-8 |
| $R^1$—Phe—$Z^1$—Cyc—$Z^1$—Cyc—$Z^2$—Cyc— | III 3-9 |
| $R^1$—Phe—$Z^1$—Phe—$Z^1$—Cyc—$Z^2$—Cyc— | III 3-10 |
| $R^1$—Phe—$Z^1$—Phe—$Z^1$—Phe—$Z^2$—PheX— | III 3-11 |
| $R^1$—Cyc—$Z^1$—Cyc—$Z^1$—PheX—$Z^2$—Phe— | III 3-12 |
| $R^1$—Cyc—$Z^1$—Cyc—$Z^1$—Phe—$Z^2$—PheX— | III 3-13 |
| $R^1$—Cyc—$Z^1$—PheX—$Z^1$—Phe—$Z^2$—Cyc— | III 3-14 |
| $R^1$—Cyc—$Z^1$—Phe—$Z^1$—PheX—$Z^2$—Cyc— | III 3-15 |
| $R^1$—PheX—$Z^1$—Phe—$Z^1$—Cyc—$Z^2$—Cyc— | III 3-16 |
| $R^1$—Dio—$Z^1$—Cyc—$Z^1$—Cyc—$Z^2$—Cyc— | III 3-17 |
| $R^1$—Cyc—$Z^1$—Cyc—$Z^1$—Cy—$Z^2$—Phe— | III 3-18 |
| $R^1$—Cyc—$Z^1$—Pip—$Z^1$—Phe—$Z^2$—Phe— | III 3-19 |

In the compounds of the sub-formulae III 3-1 to III 3-19, at least one of the two groups $Z^1$ and $Z^2$ is very particularly preferably a single bond.

Liquid-crystalline side-chain polymers are prepared by polymerization processes which are known per se and are described in the literature (for example in the standard works such as Odian, Principles of Polymerization, McGraw-Hill, N.Y.), to be precise under reaction conditions which are known and suitable for the reactions. Use may also be made here of variants which are known per se, but are not described here in greater detail.

In the case of the liquid-crystalline side-chain polymers, on the one hand monomers and/or oligomers which already carry liquid-crystalline and/or mesogenic groups can be polymerized, it being possible to make a further distinction between chain-growth reactions (for example free-radical or ionic polymerization) and step-growth reactions (for example polycondensation or polyaddition). On the other hand, the mesogenic groups may be attached subsequently to existing polymer chains with the aid of a grafting reaction.

The polymeric composite material according to the present invention can also be based on liquid-crystalline elastomers or contain them in a lower percentage. Elastomers can be obtained by 3-dimensional crosslinking either of liquid-crystalline main chain polymers or liquid crystalline side-chain polymers; however, the use of the side-chain polymers is preferred. The composite materials according to the present invention are preferably based on side-chain polymers and/or oligomers or mixtures containing at least one side-chain polymer and/or oligomer.

The liquid crystal polymer component is preferably chosen in such a way that it exhibits a high or rather high glass transition temperature. Liquid crystal polymer components with a glass transition temperature of at least 60° C. and, in particular, not less than 70° C. are preferred. Especially preferred are liquid crystal polymer components exhibiting a glass transition temperature of 80° C. or more.

When designing the liquid crystal polymer component for a specific composite material, the expert will mainly rely on the pool of liquid crystal side chain polymers and/or oligomers described above in detail. The liquid crystal polymer component preferably contains at least 35% and, in particular, at least 50% of one or more liquid crystal polymers and/or oligomers according to formula I with B being defined by formula III.

Obtaining a liquid crystal polymer component with a sufficiently high glass transition temperature is routine work for the expert, and does not require any inventive effort, in particular where the liquid crystal polymer component is being based on side chain polymers and/or oligomers according to formulae I and III. It is, for example, well known among experts that the glass transition temperature of liquid crystalline polymers and/or oligomers can be increased if the length of the spacer is chosen to be rather short, for example, as $C_2$-$C_6$ and, in particular, $C_2$-$C_4$, and/or if a rather "stiff" polymer backbone like, for example, a polymethacrylate, or a poly-α-haloacrylate is used. The glass transition temperature of the liquid crystal polymer component can also be increased by adding a high-$T_G$ liquid crystal polymer to a given base mixture.

It was now found that composite materials with the desired properties as specified in claim 1 can be obtained if the liquid crystal polymer component is mixed with a reactive liquid crystal component with subsequent polymerization.

The term reactive liquid crystalline compounds denotes compounds of formula II $$R'\text{—}G'\text{—}R'' \qquad \text{II}$$

wherein at least one of the terminal groups R' and R'' is a reactive group exhibiting one reaction site such as a hydroxyl group $HOW'_2C$-, a thiol group $HSW'_2C$—, an amino group $HW'N$—, a carboxyl group, an epoxide group

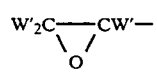

or an iso-cyanate group $O\!=\!C\!-\!N$—, or a polymerizable reactive group exhibiting two or more reactive sites such as a vinyl type group $W'_2C\!=\!CW'$—, a (meth)acrylate type group

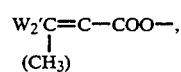

a styrene type group

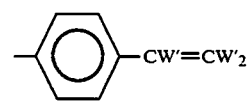

with W' being independently from each other H or an alkyl group with 1–5 C atoms, the other terminal group is also, independently from the first terminal group, a reactive group with one or more reactive sites or an alkyl radical with up to 15 C atoms which is unsubstituted or mono- or polysubstituted by halogene, it being also possible for one or more $CH_2$ groups in these radicals to be replaced, in each case independently of one another, by —O—, —S—, —CO—, —OCO—, —CO—O— or —O—CO—O— in such a manner that O atoms are not linked directly to one another, G is a rod-like diyl group of the formula $$-S^1-(A^5-Z^3)_o-A^6-S^2-$$

with $S^1$ and $S^2$ being independently from each other alkylene groups with 0-20 C atoms which can be linear or branched, where 0 carbon atoms is equivalent to $S^1$ or $S^2$ being a single bond, it also being possible for one or more $CH_2$ groups to be replaced, in each case independently from each other, by —O—, —CO—, —S—, or —NW'—, with the proviso that O atoms are linked directly to one another, $A^5$ and $A^6$ denote, independently from each other,
  a) a cyclohexylene group, wherein one or two nonadjacent $CH_2$ groups may be replaced by O or S atoms,
  b) an unsubstituted 1,4-phenylene group wherein one to three CH grops may be replaced by —N— or a 1,4-phenylene group which is mono- or polysubstituted by F, Cl and/or $CH_3$,
  c) a bicyclo(2,2,2)octylene group, a naphthaline-2,6-diyl group, a decahydronaphthaline-2,6-diyl group or 1,2,3,4-tetrahydronaphthaline group, $Z^3$ is independently from each other —CO—O—, —O—CO—, —$CH_2CH_2$—, —$CH_2O$—, —$OCH_2$—, —C≡C— or a single bond, and o denotes 1,2,3, or 4.

The term reactive liquid crystalline compounds comprises both monotropic, enantrotropic or isotropic compounds according to formula II.

In a preferred embodiment of the polymeric composite materials according to the present invention, at least one of R' and R'' preferably is or contains an
  ene-group

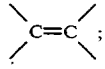

particular preferred are acrylates and methacrylates.

The addition of reactive liquid crystalline compounds of formula II exhibiting two reactive groups R' mid R'', to the liquid crystal polymer compound is preferred. Also preferred is the addition of a reactive liquid crystalline component, containing at least two different reactive liquid crystalline compounds according to formula II at least one of which contains 2 reactive groups R' and R''. Reactive liquid crystalline components containing at least one reactive liquid crystalline compound with one reactive group R' (monofunctional reactive liquid crystalline compound) and at least one reactive liquid crystalline compound with two reactive groups (difunctional reactive liquid crystalline compound) often are especially preferred. Also preferred are reactive liquid crystalline components consisting of one or more monofunctional reactive liquid crystalline compounds.

Especially preferred difunctional reactive liquid crystalline compounds are diene-type compounds such as divinyls, diacrylates or dimethacrylates, furthermore diols, dithiols and diisocyanates, but also compounds with different reactive groups such as ene-ols, ene-thiols, vinylacrylates etc.

Especially preferred monofunctional reactive liquid crystalline compounds are ene-type compounds, thiols and iso-cyanates.

The groups $S^1$ and $S^2$ acting as spacer groups between the reactive groups R' and R'' and the mesogenic core —$(A^5-Z^3)_m$—$A^6$ are independently from each other an alkylene group with 0-20 C atoms which can be linear or branched, with $S^1$ and $S^2$ being independently from each other alkylene groups with 0-20 C atoms which can be linear or branched, where 0 carbon atoms is equivalent to $S^1$ or $S^2$ being a single bond, it also being possible for one or more $CH_2$ groups to be replaced, in each case independently from each other, by —O—, —CO—, —S—, or —NW'— with the proviso that oxygen atoms are not linked directly to one another.

The length and the structure of the groups $S^1$ and $S^2$ determine whether the mesogenic group exhibits a more or less pronounced degree of flexibility. The following list of suitable groups $S^1$ and $S^2$ is intended to be illustrative and not limiting:

ethylene, propylene, butylene, pentylene, hexylene, heptylene, octylene, decylene, undecylene, dodecylene, octadecylene, ethyleneoxyethylene, methyleneoxybutylene, ethylenethioethylene, ethylene-N-methyliminoethylene, (1-oxy)methyleneoxyloxy, (2-oxy)ethyleneoyloxy, (3-oxy)-propyleneoyloxy, (4-oxy)butyleneoyloxy, (5-oxy)-pentyleneoyloxy, (6-oxy)hexyleneoyloxy, (7-oxy)-heptyleneoyloxy, (8-oxy)octyleneoyloxy, (1-oxy)-methyleneoxycarbonyl (2-oxy)ethyleneoxycarbonyl, (3-oxy)-propyleneoxycarbonyl, (4-oxy)-butyleneoxycarbonyl, (5-oxy)-pentyleneoxycarbonyl, (6-oxy)hexyleneoxycarbonyl, (7-oxy)-heptyleneoxycarbonyl and (8-oxy)octyleneoxycarbonyl.

The mesogenic core —$(A^5-Z^3)_m$—$A^6$ of the reactive liquid crystalline compounds can exhibit 2, 3, 4 or 5 rings:

 (1)

 (2)

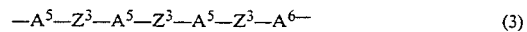 (3)

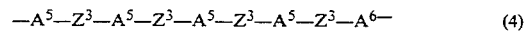 (4)

Especially preferred for use in the polymeric composite materials according to the present invention are reactive liquid crystalline compounds exhibiting 2-, 3- or 4-ring mesogenic groups according to formula (1)–(3) and in particular 2 or 3-ring mesogenic groups according to formula (1) or (2).

In the following, for sake of simplicity, Cyc is a 1,4-cyclohexylene group, Phé is a 1,4-phenylene group which can be unsubstituted or mono-, di- or trifluorinated, Dio is a 1,3-dioxane-2,5-diyl group, Pyd is a pyridine-2,5-diyl group, Pyr is a pyrimidine-2,5-diyl group, Pip is a piperidine-1,4-diyl group, Bio is a 1,4-bicyclo(2,2,2)octylene group, Nap is a naphthaline-2,6diyl group and Thn is a 1,2,3,4-tetrahydronaphthaline-2,6-diyl group; the abbreviations Dio, Pyd, Pyr and Pip comprise all possible positional isomers.

Especially preferred is the following smaller group of mesogenic cores according to formula (2):

| | |
|---|---|
| —Phé—Z³—Phé— | (2)a |
| —Cyc—Z³—Cyc— | (2)b |
| —Phé—Z³—Cyc— | (2)c |
| —Pyr—Z3—Phé— | (2)d |
| —Pyd—Z3—Phé— | (2)e |
| —Dio—Z3—Cyc— | (2)f |

In the structures according to formulae (2)a–(2)f Z³ preferably is —COO—, —OCO—, —CH₂CH₂— or a single bond. Composite materials according to the present invention, where the reactive liquid crystal component contains one or more reactive liquid crystalline compounds with a two-ring mesogenic structure according to formulae (2)a–(2)c, generally exhibit especially advantageous properties.

Especially preferred is also the use of reactive liquid crystalline compounds according to formulae II which contain a mesogenic group with 3 rings according to formulae (3)a–(3)f:

| | |
|---|---|
| —Phé—Z³—Phé—Z³—Phé— | (3)a |
| —Cyc—Z³—Phé—Z³—Phé— | (3)b |
| —Cyc—Z³—Cyc—Z³—Phé— | (3)c |
| —Cyc—Z³—Cyc—Z³—Cyc— | (3)d |
| —Pyr—Z³—Phé—Z³—Phé— | (3)e |
| —Pyd—Z³—Phé—Z³—Phé— | (3)f |

Polymeric composite materials according to the present invention, where the reactive liquid crystalline compound of which contains both at least one 2-ring reactive liquid crystalline compound with a mesogenic group according to formula 2(a)–2(f) and at least one 3-ring reactive liquid crystalline compound with a mesogenic group according to formulae 3(a)–3(f), are preferred.

In the mesogenic structures of formulae (3)a–(3)f, Z³ preferably is independently from each other a single bond,—COO—, —OCO— or —CH₂CH₂—.

Especially preferred are the following combinations with "—" representing a single bond:

| first linking group | second linking group |
|---|---|
| — | — |
| CH₂CH₂ | CH₂CH₂ |
| OCO | COO |

Polymeric composite materials according to the present invention where the reactive liquid crystalline compound contains one or more reactive liquid crystalline compounds according to formula 11 with a 4-ring mesogenic group according to formulae (4)a–(4)f, exhibit advantageous properties:

| | |
|---|---|
| —Cyc—Z³—Phé—Z³—Phé—Z³—Phé— | (4)a |
| —Cyc—Z³—Cyc—Z³—Phé—Z³—Phé— | (4)b |
| —Cyc—Z³—Cyc—Z³—Cyc—Z³—Phé— | (4)c |
| —Cyc—Z³—Phé—Z³—Phé—Z³—Cyc— | (4)d |
| —Phé—Z³—Phé—Z³—Phé—Z³—Phé— | (4)e |
| —Cyc—Z³—Cyc—Z³—Cyc—Z³—Cyc— | (4)f |

In the structures according to formula (4)a–(4)f, at least one Z³ preferably is a single bond. The other two linking groups preferably denote independently from each other a single bond, —COO—, —OCO— or —CH₂CH₂—.

Reactive liquid crystalline compounds and processes for their preparation are decribed in literature. EP 0,261,712, for example, covers liquid crystalline diacrylates of the formula

wherein $\tilde{R}$ is a hydrogen atom or a methyl group, Z' is independently from each other —COO— or —OCO—, and B is a flexible spacer, chosen from the group consisting of —(CH₂)$_x$—, —(CH₂)$_x$—O—, —(Si(CH₃)₂—O)$_x$— wherein x=1-5 or —(CH₂—CH₂—O)$_y$—O wherein y=1-8, for use in orientation layers of LCDs.

Reactive liquid crystal compounds are also described in the European patent application No. 92 107 137.9 which was filed by the present applicant on Apr. 27, 1992.

The present inventors found out that polymeric composite materials with a high glass transition temperature T$_G$ of at least 60° C. and a good scattering power can be obtained if the following sequence of reaction steps (1)–(3) is applied:

(1) The liquid crystal polymer component is mixed with the reactive liquid crystal component. Mixing can be effected by simple mechanical mixing using, for example, a conventional mixing apparatus; it was found, however, that simply allowing the liquid crystal polymer component to dissolve in the reactive liquid crystal phase, is extremely slow, typically several days some weeks or more, even at elevated temperatures. Dissolving of the liquid crystal polymer component and the reactive liquid crystal component in a suitable cosolvent like, for example, DCM (=dichloromethane) or cyclopentanone with subsequent evaporation of the cosolvent is much quicker and therefore generally preferred. Mixing can be performed, for example, at room temperature or at elevated temperatures.

The ratio of the liquid crystal polymer component with respect to the mass of the polymeric composite material preferably is between 25 and 95% and, in particular, between 40 and 95%; the ratio of the reactive liquid crystalline component with respect to the mass of the polymeric composite material preferably varies between 1 and 65% and, in particular, between 5 and 45%.

The mixture can contain other components in addition to the liquid crystal polymer component and the reactive liquid crystal component.

Where the reactive liquid crystalling component is being based on photocurable compounds like, for example, ene-type compounds, a photoinitiator component consisting of one or more photoinitiator compounds is preferably added. Suitable photoinitiators which might be radical or ionic, are described, for example, in DE 41 02 215. The addition of an initiator component can frequently be omitted in case an epoxy-based reactive liquid crystalline component is used.

Information is usually written into the cured film formed in step (3) by using a finely focussed heat source like, for example, a laser beam. In order to effectively absorb the laser energy, a dye component is preferably added to the mixture which exhibits a significant absorption at the emission wavelength of the laser. The dye component may consist of a single dye compound but it is also possible to use a component comprising two or more dye compounds. The following dyes are especially suited for the enhancement of absorption of He—Ne light (633 nm) with these examples being thought to be illustrative and not limiting:

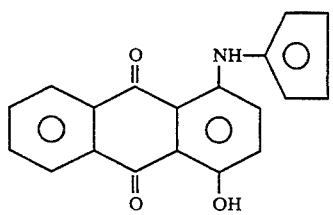

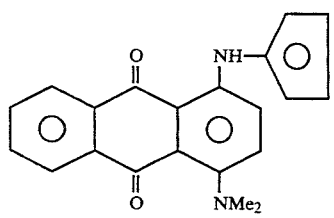

Especially preferred are semiconductor lasers which typically have an emission wavelength in the range between 750–950 nm and, in particular, between 800–900 nm, and the dye component consequently should be adjusted to exhibit a significant absorption in this range. Examples of dyes which absorb laser light from a semiconductor laser (800–900 nm) are:

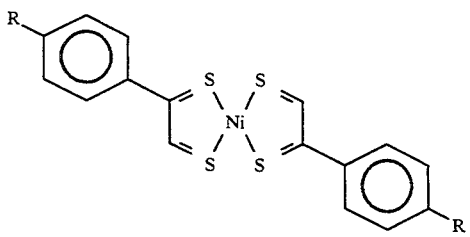

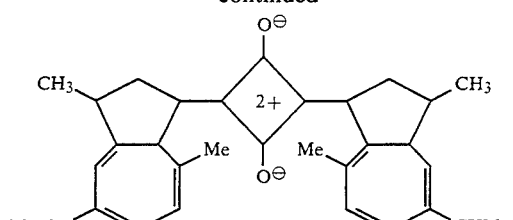

Me = methyl

It is, however, also possible to use other types of lasers and also other heat sources like, for example, electrical heating.

The dye component described is preferably added to the mixture but it is also possible to attach the dye component to the surface of the film prior to (i.e. after step (2)) or after film curing (i.e. after step (3)). Adding the dye component to the mixture is often preferred since otherwise, in particular in the case of free standing films, an additional coating of the cured film is often required for the mechanical protection of the dye component.

The uncured mixture prepared in step (1) may contain other additives like, for example, surface-active substances for improving the dispersibility of the reactive liquid crystalline component, antioxidants, VIS-colorants, UV stabilizing agents etc. The concentration of such timber additives with respect to the mass of the polymeric composite material preferably is not too high and, in particular, less than 20% and especially not more than 10%.

The liquid crystal polymer component, the reactive liquid crystalline component and optionally the other components of the uncured mixture and their respective concentrations are preferably chosen in such a manner that the uncured mixture exhibits a liquid crystalline phase with the proviso that the clearing point of the mixture is higher than the glass transition temperature of the mixture. The liquid crystalline phase is required to establish a scattering texture which is due to fluctuations of the LC direction on a sub-micron to micron scale. The scattering texture is retained during subsequent polymerization step (3) (see below) which is performed above the glass transition temperature of the uncured mixture.

The adjustment of the preferred properties of the uncured mixture can easily be performed by the expert without any inventive effort.

The glass transition temperature of the uncured mixture generally can effectively be reduced with respect to the glass transition temperature of the liquid crystalline polymer component if the mixture contains one or more reactive liquid crystalline 2-ring compounds accordng to formula II (o=1). Especially preferred are reactive liquid crystalline 2-ring compounds of formula II containing only one reactive terminal group; the non-reactive group of R' and R" is particularly a substituted or unsubstituted alkyl group.

Especially preferred 2-ring compounds of formula,II are

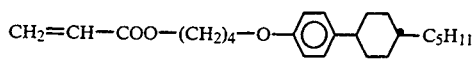

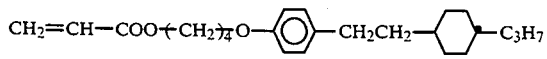

Uncured mixtures where the reactive liquid crystalline component contains at least one reactive liquid crystalline 2-ring compound according to formula II are generally characterized by advantageous properties and are preferred. They quite generally exhibit a liquid crystalline phase fulfilling the desired condition that the clearing temperature is higher than the glass transition temperature.

Curing of these mixtures usually results in polymeric composite materials exhibiting sufficiently high values of the glass transition temperature. Where the polymeric composite material exhibits a liquid crystalline phase, it is often found that the difference between the clearing point and the glass transition temperature of the cured polymeric composite material is rather low.

This feature is especially preferred where information is to be written into the polymeric composite material by a laser. The higher the clearing temperature of the cured composite material with respect to its glass transition temperature, the more thermal energy is needed to locally raise the temperature of the cured film above the clearing temperature to create writing on the film. The difference between clearing temperature and glass transition temperature of the cured composite material thus is a significant factor which determines the speed at which a given laser with a specific energy can move across the surface of the composite film, i.e. in other words the writing speed.

Also preferred are uncured mixtures containing at least one reactive liquid crystalline 3-ring compound according to formula II (o=2) which can exhibit one or two reactive terminal groups R' and R". Uncured mixtures of this type generally exhibit advantageous properties and they are preferred; especially preferred are uncured mixtures containing at least one reactive liquid crystalline 3-ring compound the mesogenic core of which being defined via formulae (3)a-f.

Uncured mixtures containing at least one reactive liquid crystalline 3-ring compound and particularly at least one of the preferred 3-ring compounds quite generally exhibit a liquid crystalline phase the clearing temperature of which being higher than the glass transition temperature of the uncured mixture. Furthermore the glass transition temperature of the cured polymeric composite material is sufficiently high.

The present inventors furthermore found out that the glass transition temperature and the clearing point of the uncured mixture generally can easily be tuned and adjusted with respect to each other if the reactive liquid crystalline component contains (i) at least one reactive liquid crystalline 2-ring compound according to formula II (o=1) which can exhibit one or two, preferably, only one reactive terminal groups R' and R", and (ii) at least one reactive liquid crystalline compound with 3 or more (o≧2), preferably 3 rings according to formula II which can exhibit one or two reactive terminal groups R' and R".

This especially preferred mixture concept quite generally yields uncured mixtures which exhibit one or more liquid crystalline phases with the clearing temperature being higher—in most cases 5° C. or more, depending on what is convenient from a practical point of view (cf. step (3)), than the glass transition temperature of the uncured mixtures.

It was further found that the polymeric composite materials obtained by curing these mixtures quite generally exhibit a high glass transition temperature of 70° C. or more which is very desirable from a practical point of view in order to prevent accidential erasure of the data. It was further found out that the glass transition temperature of the cured composite material can be tuned by varying the ratio of 2-ring and 3-ring reactive liquid crystalline compounds and/or the ratio of reactive liquid crystalline compounds with one or two reactive terminal groups R' and R". The glass transition temperature of the cured composite material can generally be increased by increasing the percentage of 3-ring reactive liquid crystalline compounds and/or the percentage of reactive liquid crystalline compounds with two reactive terminal groups while the clearing point is often less affected by such changes. It is therefore also possible to tune the difference between the clearing point and the glass transition temperature of the cured composite film and hence the writing speed of a laser.

The concepts for preparing the uncured mixture described are preferred but they are thought to be merely illustrative and by no means restrictve. The composite materials according to the present invention can also be obtained via other uncured mixtures.

The uncured mixture can exhibit a nematic, cholesteric and/or smectic, preferably, however, a nematic phase. The clearing point is preferably 1°-50° C. higher than the glass transition temperature, in particular, 5°-25° C., in order to have a sufficient temperature range of processing. Outside the temperature range of processing, the uncured mixture can be liquid-crystalline or not liquid crystalline.

It is usually sufficient if one of the liquid crystal polymer component and the reactive crystal component exhibits one or more liquid crystal phases, in particular in the temperature range of processing since it was frequently observed that the reactive liquid crystalline component induces a liquid crystalline phase in the resulting uncured mixture. Mixtures wherein both the liquid crystal polymer component and the reactive liquid crystal Component exhibit one or more liquid crystalline states are particularly preferred while mixtures wherein none of these components is liquid-crystalline, are usually less preferred.

(2) The mixture is coated on a supporting surface to form a thin film. Using a solution of the liquid crystal component and the reactive liquid crystal component in a suitable solvent is generally preferred; the solvent is subsequently evaporated.

The film thickness can be varied to a great extent but usually film thickness between 2 μm and 10 mm are preferred; smaller films often exhibit an insufficient scattering and hiding power while it is often found difficult to render thicker film transparent thermally in a defined and precise way. Particularly preferred are films with a thickness between 2.5–500 μm; especially preferred are values of the film thickness between 2.5–40 μm, and it was found that film thickness is best at 3–10 μm. The films can be peeled of after curing (see step (3)) to give free standing films or they may be supported by one or more, in particular by one suitably chosen substrate (transparent and/or colored substrate, for example); the geometry of the substrates can be varied to a great extent. Only one substrate is usually preferred in case substrates are used—if two are used, the width of the laser written lines becomes broader due to heat dissipation on the substrate.

The mixture comprising the liquid crystal polymer and the reactive liquid crystal components exhibits a relatively low to low glass transition temperature (due to the reactive liquid crystal component behaving as a plasticizer) and this allows the film to scatter light due to fluctuations of the LC direction on a submicron to micron scale.

(3) The reactive liquid crystalline component is subsequently polymerized by applying UV radiation, heat etc. thus forming the composite material according to the present invention.

Polymerization is preferably effected at a temperature below the clearing point of the uncured mixture obtained in step (1).

Polymerization must be performed above the glass temperature of the uncured film of step (1) and (2); in case the uncured film exhibits a liquid crystalline phase, the polymerization temperature is in particular adjusted to be between the glass transition temperature and the clearing point.

The cured polymeric composite material may be liquid-crystalline or not liquid-crystalline. Transformation from the scattering to the transparent state requires in the case of liquid-crystalline composite material heating above the clearing point and in case of the non liquid-crystalline composite material heating above the glass transition temperature. Composite materials exhibiting a clearing point and glass transition point of at least 70° C., especially at least 80° C. and, in particular, at least 85° C. are quite generally preferred, in order to prevent accidental erasure of data.

In case of liquid crystalline composite materials, the scattering state is reversible, i.e. can be restored by slow cooling from the transparent state. In case of non-liquid crystalline composite materials, this is often not possible so that the curing conditions must be controlled carefully.

The composite materials obtained are especially useful for permanent data storage. Verbal information, symbols, diagrams etc. can be written in by heating file desired parts of the composite material with a freely focussed laser beam or other heat sources to temperatures above the glass transition and/or clearing temperature thus rendering the composite material transparent. The transparent state can be maintained by rapidly cooling the composite material below the glass transition temperature of the composite material, and the information is depicted in form of transparent characters, symbols etc. on a scattering background. For this preferred application, the polymeric composite material preferably contains a dye component which very specifically exhibits a significant absorption at the emission wavelength of the laser used for writing in information. Supercooling of polymers or liquid crystalline polymers so as to obtain a glassy state is well known. For example, see H. Finkelmann, "Liquid Crystal Polymers", in *Thermotropic Liquid Crystals*, edited by G. W. Gray, John Wiley & Sons, Chichester, 1987, pp. 163–4. The cooling rate of the film can be controlled, for example, by applying the film to a substrate with a high heat transfer coefficient, the temperature of which is controlled by electrical heating, optionally in combination with cooling (water cooling, cooling by liquid nitrogen, etc.), so as to adjust a certain cooling rate. Techniques for adjusting cooling rates are described, for example, in handbooks of DSC or DTA manuals. It may be appropriate to apply other conventional techniques.

Heating should be effected rather rapidly in order to avoid dissipation of the thermal energy; heating with laser energy therefore is usually especially preferred. The composite materials according to the present invention sometimes exhibits no precise clearing temperature but they become progressively clearer in a temperature range of, for example, 10°–20° C., and the maximum temperature is preferably adjusted in such a way that a high transparency and thus a high contrast is obtained. The difference between the clearing point and the glass transition temperature of the cured composite film preferably is rather low, in particular 20° C. or less and very specifically 10° C. or less in order to realize a high writing speed of the laser. It is also possible, that the clearing point of the cured composite material is lower than its glass transition temperature although the clearing point should not be too low in order to prevent accidental erasure of information.

Subsequently, the material is cooled below the glass transition temperature with a high cooling rate in order to avoid restoration of the scattering state; the cooling rate preferably is not less than 20K./min and, in particular, more than 40 K./min; these values are, however, thought to be only illustrative and by no means limitative.

The composite material can preferably be used, for example, as master-fiche in card-indices, as permanent overhead sheet etc. and is thus of enormous economic importance.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth in degrees Celsius; and, unless otherwise indicated, all parts and percentages are by weight.

The entire disclosures of all applications, patents, and publications cited herein, and of corresponding European Application No. 92116050.3, filed Sep. 19, 1992, are hereby incorporated by reference.

EXAMPLE 1 a) A liquid crystal polymer of the following formula (1) (which is commercially available as LCP 96 through Merck Ltd., Poole, UK)

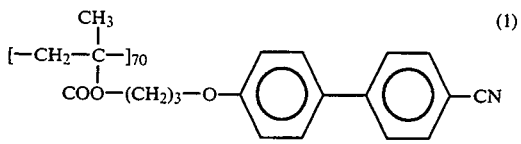

(1)

exhibits no LC phase and has a glass transition temperature of $T_G = 85°$ C.

When coating this liquid crystal polymer as a thin film onto a glass substrate (film thickness was varied between 5 and 20 μm), one obtains a transparent, not a scattering film.

b) The liquid crystal polymer described in a), a reactive liquid crystal compound of the following formula (2)

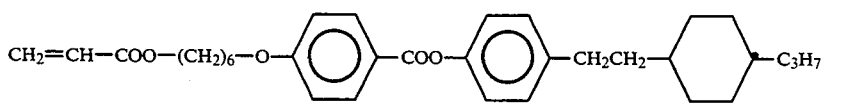

(2)

and the photoinitiator DAROCUR ® 1173 (commercially available through Ciba-Geigy, Switzerland) are dissolved in a mass ratio of 82.64:16.53:0.83 in dichloromethane (DCM) to give a concentrated solution. The solution is coated onto a glass substrate and the solvent is evaporated in a warm (40° C.), vacuum oven (manufactured by Gallenkamp).

The uncured film thus obtained shows intense light scattering up to 100° C. after which it becomes progresively less opaque and finally clear at 110°–115° C. On cooling, the film starts to scatter light at 95° C.

FIG. 1 shows a DSC curve and heat of the uncured film (sample size 4.0 mg) recorded with Perkin Elmer DSC 7 at a heating rate of 10° C./min. The first cycle shows a glass transition point at $T_G = 44.8°$ C. and a melting point at 51° C. while the second cycle (shown in FIG. 1) shows only a $T_G$ at 41° C., the melting peak has disappeared.

Figure 2:
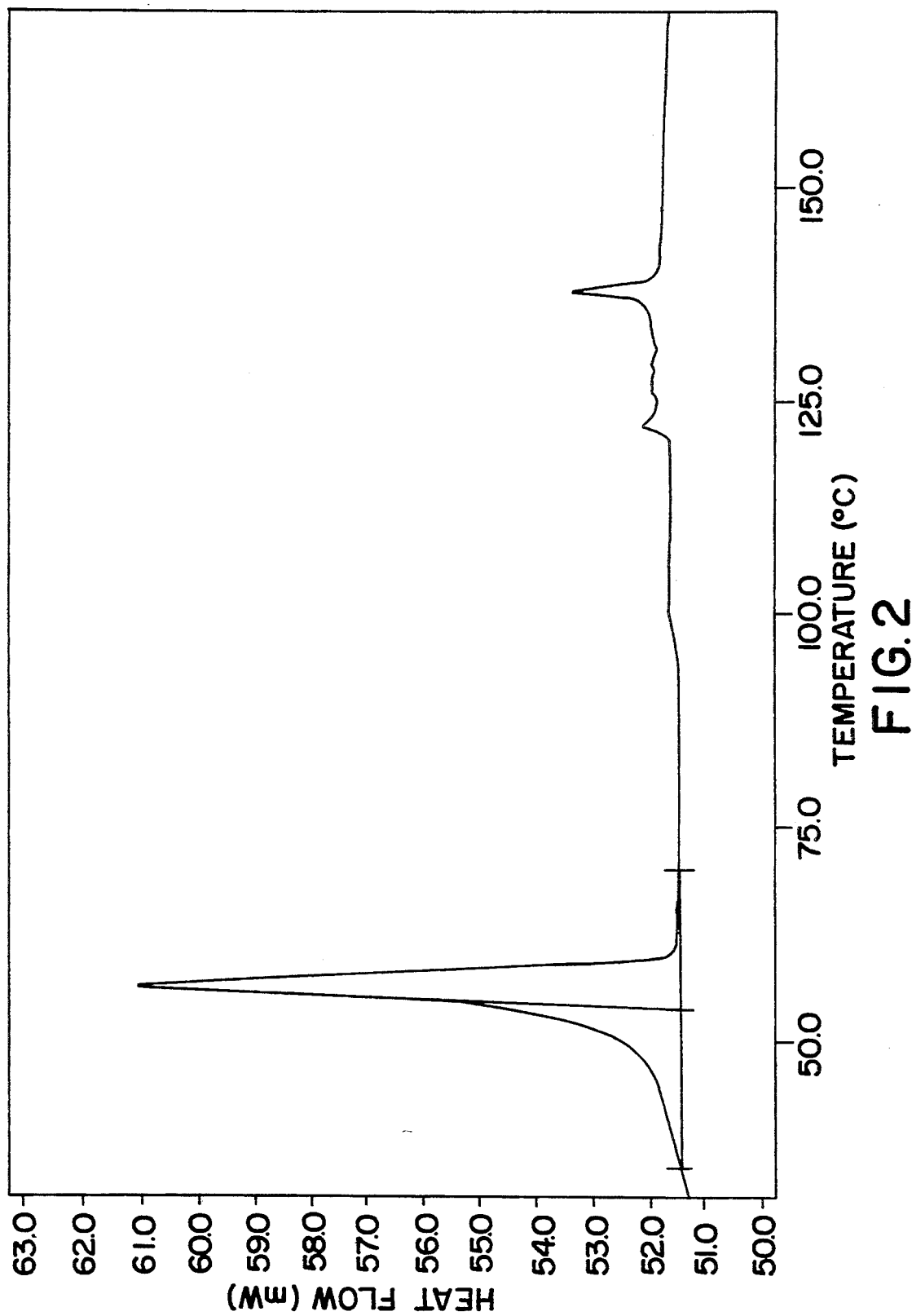
FIG. 2 shows a DSC curve for the reactive liquid crystal compound of Example 1.

The melting peak in the first cycle is due to the reactive liquid crystal compound (2) incorporated into the film; FIG. 2 shows the DSC trace for the pure compound (2) (4.6 mg) exhibiting a melting point of 56° C. and a clearing point N-I of 147° C. (Perkin Elmer DSC 7, 10° C./min).

c) The uncured film obtained in b) was heated to a temperature of 50°–70° C., i.e. above the glass transition temperature of the film so that the film was mobile, and it was subsequently irridiated with a UV light source (Heraeus Suntest, Xenon lamp, 3 mW cm⁻² total light output).

Figure 3:
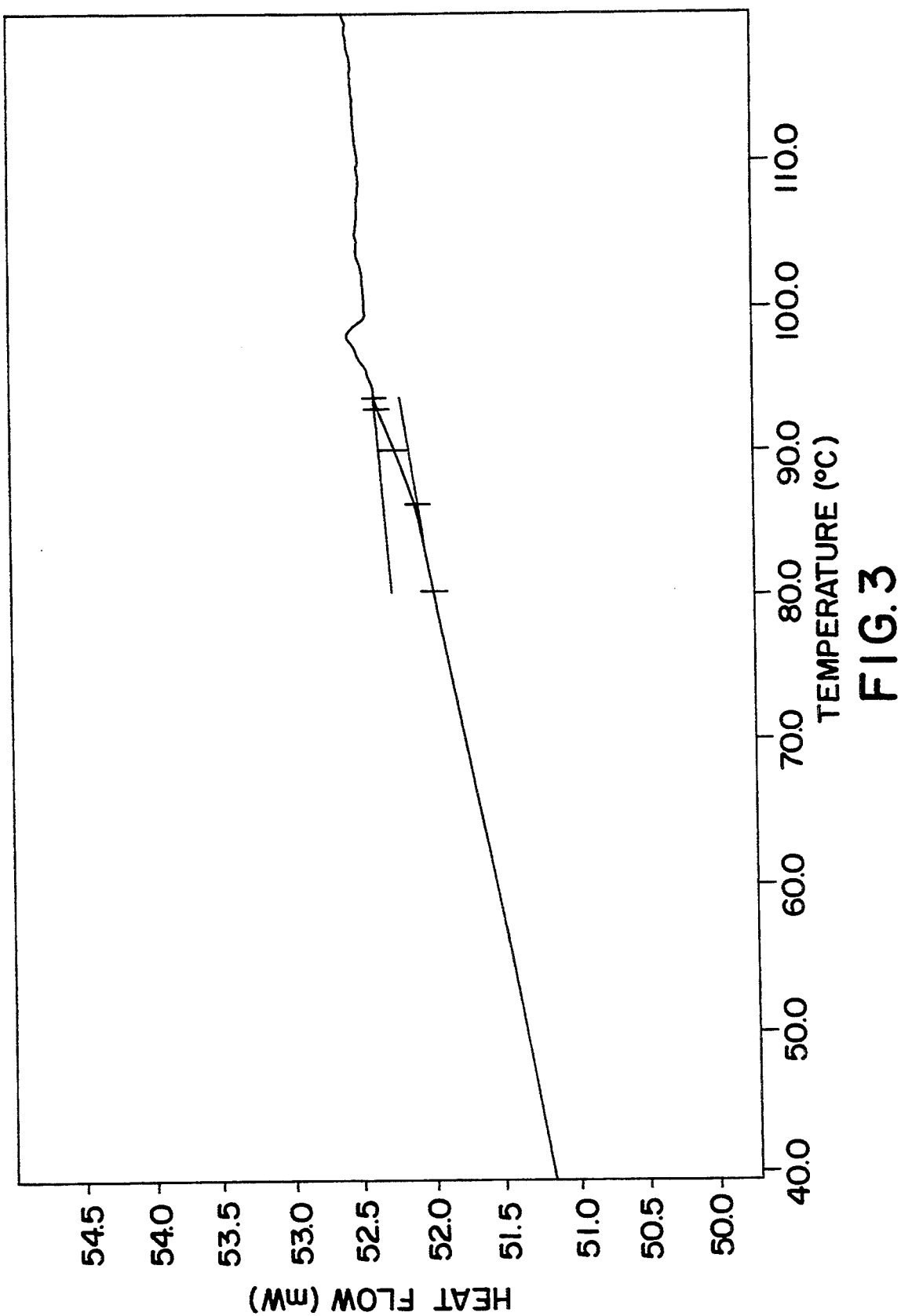
FIG. 3 shows a DSC curve for the cured film of Example 1.

FIG. 3 shows a DSC trace for the cured film (Perkin Elmer DSC 7, sample size: 4.4 mg, heating rate 10° C./min). In the first cycle, a small melting point peak is observed at 50° C. which is due to unreacted reactive liquid crystalline compound (2); in subsequent cycles, (shown in FIG. 3) this peak is not observed. The glass transition peak of the uncured film at 41° C. has disappeared and a new glass transition peak at $T_G = 90°$ C. is observed followed by an endotherm transition.

The film shows intense light scattering up to 130°–140° C. in which range it becomes progressively clearer. On cooling with a low cooling rate (typically 5–10 K./min), light scattering reappears at 105°–100° C. which seems to correspond to a small peak at 105° C. in the DCS trace plotted in FIG. 3.

On very fast cooling from the transparent state (typically >40 K./min), the clear texture was frozen in. Whereas the surrounding areas scattered light, the fast cooled area was clear and remained like this from ambient temperature (20° C.) up to 90°–95° C. where it scattered light again. This determines the upper operating temperature range at which data can be stored.

EXAMPLE 2 a) A liquid crystal polymer of the following formula (3) (which is available as LCP 133 through Merck Ltd., Poole, UK)

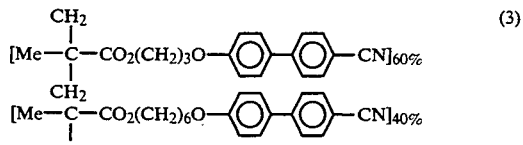

(3)

Me = methyl exhibits a clearing point N-I of 97° C. and a glass transition temperature of 73° C.

A film obtained by coating (3) onto a glass substrate (film thickness 5–20 μm) does not scatter light well.

b) The liquid crystal polymer described in a) and the reactive liquid crystal compound of formula (4)

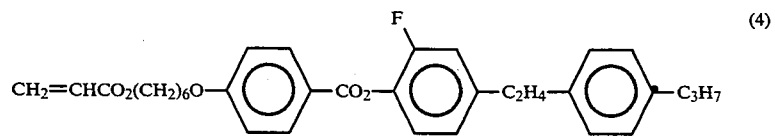

(4)

are dissolved in cyclopentanone in a mass ratio of 83.4:16.6; compound (4) which exhibits a mpt. of 60° C. and a clearing point N-I of 124° C. is available through Merck Ltd. as RM 22. The mixture is then coated onto a polyester film to give an 8 μm thick film after evaporation of the solvent in an oven at 120° C. The film was slowly cooled from 120° C. at a cooling rate of 2° C./min to give an uncured film which scatters light well and exhibits the following properties:

glass transition temperature $T_G$: 53° C.
clearing point N-I: 101° C.

c) 1% of the photoinitiator Darocur ® 1173 is added to the uncured mixture obtained in b). The film is heated to a temperatue above the glass transition temperature and below the clearing point of the uncured mixture and cured by irradiation with UV light. The cured film exhibits the following properties:

glass transition temperature $T_G$: 68° C.
clearing point N-I: 102° C.

EXAMPLE 3 a) A liquid crystal polymer of the following formula (5) (which is available through Merck Ltd., Poole, UK as LCP 100)

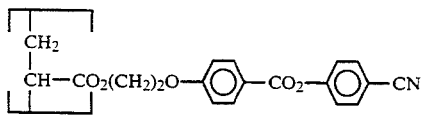   (5)

exhibits the following properties:
  clearing point N-I: 120° C.
  glass transition temperature $T_G$: 85.5° C.

A film obtained by coating (5) onto a glass substrate (film thickness 5–20 μm) does not scatter light well.

b) The liquid crystal polymer described in a) and the reactive compound of formula (6)

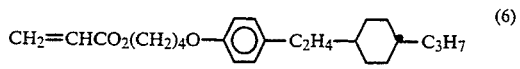   (6)

are dissolved in cyclopentanone in a mass ratio of 83.4:16.6; compound (6) is an oil at room temperature and is available through Merck Ltd. as RM 57. The mixture is then cast to give a 6 μm film after evaporation of the solvent in an oven at 120° C. The film is slowly cooled from 120° C. at a cooling rate of 2° C./min to give an uncured film which scatters light well and exhibits the following properties:
  glass transition temperature $T_G$: 51° C.
  clearing point N-I: 90° C.

c) 1% of the photoinitiator DAROCUR® 1173 is added to the uncured mixture obtained in b). The film is heated at a temperature above the glass transition temperature and below the clearing point of the uncured mixture and cured by irradiation with UV light. The cured film exhibits the following properties:
  glass transition temperature $T_G$: 65° C.
  clearing point N-I: 90° C.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A polymeric composite material which:
   is based on a liquid crystal polymer component,
   exhibits a glass transition temperature of at least 60° C. and a scattering state when deposited as a thin film,
   can be rendered transparent by being heated above its glass transition and/or clearing temperature, and
   is obtained by mixing a liquid crystal side chain polymer component comprising rod-like side chains, a reactive liquid crystalline component which takes part in polymerization, optionally a polymerization initiator component, and optionally further additive components, with subsequent polymerization.

2. A composite material according to claim 1, wherein the liquid crystal polymer component contains one or more liquid crystal side chain polymers of formula I

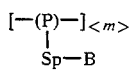   I wherein
  P is a polymer main chain group,
  Sp is a bivalent spacer group,
  B is an organic rod-like radical containing at least two 6-membered ring groups or a board-like radical, and
  $<m>$ is the mean degree of polymerization.

3. A composite material according to claim 1, wherein the liquid crystal polymer component has a glass transition temperature of at least 60° C.

4. A composite material according to claim 1, wherein the ratio of the liquid crystalline polymer component with respect to the mass of the composite material is between 25% and 95%.

5. A composite material according to claim 1, which contains a dye component.

6. A composite material according to claim 5, wherein the dye component is selected so as to exhibit an absorbance at the emission wavelength of a laser used for writing information into the composite material.

7. A process for the preparation of a composite material according to claim 6, wherein a liquid crystal polymer component, a reactive liquid crystal component, optionally further an initiator component, and optionally further additive components and a low-boiling solvent component are mixed, the mixture is applied to a surface where the solvent component is evaporated, and polymerization is initiated.

8. A mixture which is a precursor of the composite material according to claim 1, containing a liquid crystal polymer component, a reactive liquid crystal component, optionally a polymerization initiator component, optionally a solvent component and optionally further additive components.

* * * * *